Patented June 24, 1924.

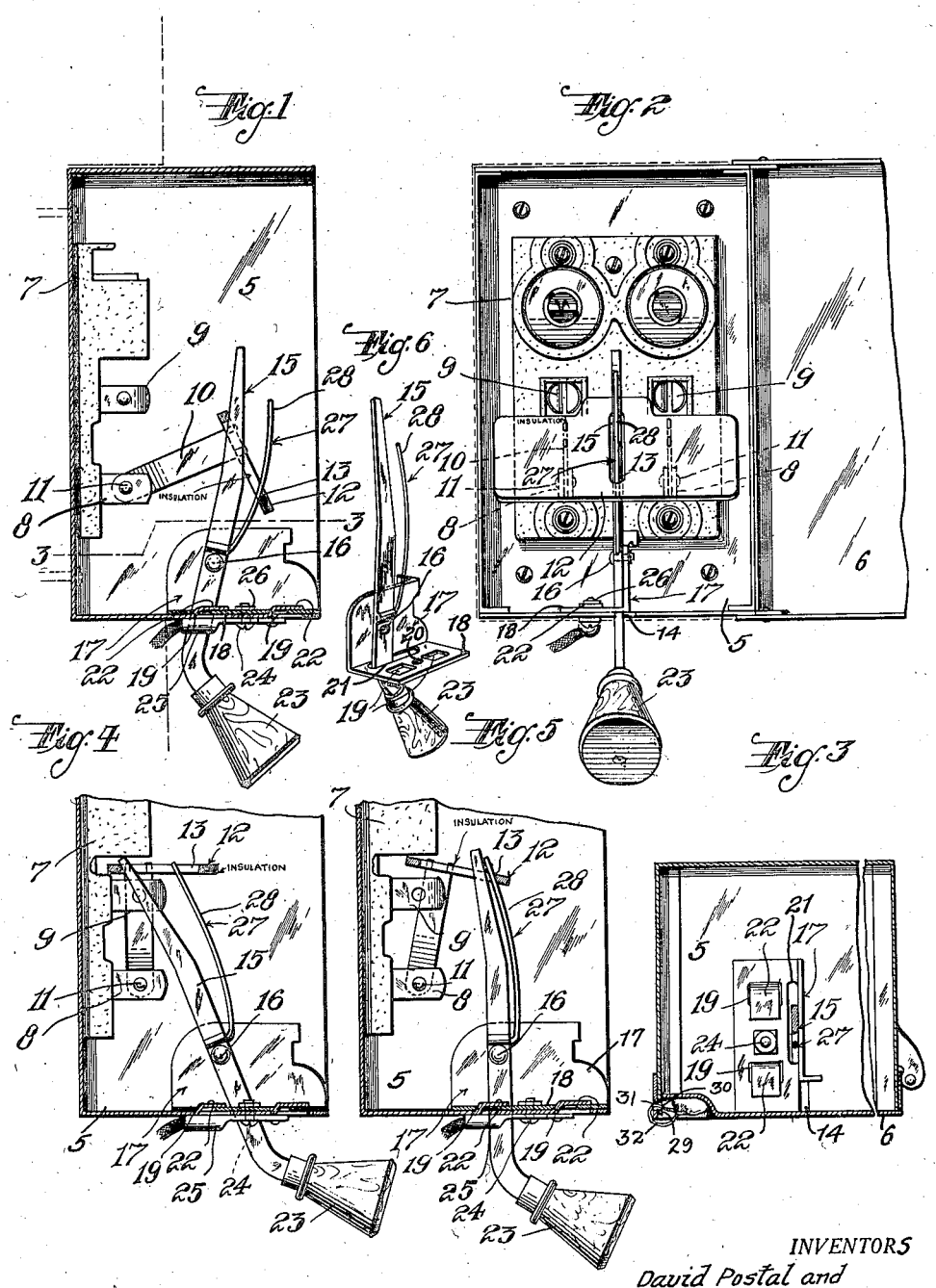

1,499,074

UNITED STATES PATENT OFFICE.

DAVID POSTAL, OF BROOKLYN, AND SAMUEL HAMMER, OF NEW YORK, N. Y., ASSIGNORS TO UNITED METAL BOX CO. INC., OF NEW YORK, N. Y.

ELECTRIC SWITCH.

Application filed April 13, 1921. Serial No. 461,020.

*To all whom it may concern:*

Be it known that we, DAVID POSTAL and SAMUEL HAMMER, citizens of the United States and Republic of Russia, respectively, and residents of the borough of Brooklyn, county of Kings, city and State of New York, and borough of Bronx, city and State of New York, respectively, have invented certain new and useful Improvements in Electric Switches, of which the following is a specification.

This invention relates to electric switches of that type wherein the parts of the switch are enclosed within a box or casing and has for its primary object to provide an externally operated actuating lever for the movable switch part pivotally mounted within the box.

It is another object of our present invention to provide operating means for the movable switch part which is in the form of a separable unit together with means for detachably mounting the switch operating unit upon one of the box walls. Thus during the rough preliminary work in installing the switch box, the switch operating means may be omitted, thus enabling the work to be executed more conveniently and with greater ease and facility while obviating possible damage or injury to the parts of the switch or its operating means. After the box has been properly installed, the switch operating unit may be easily and quickly applied in operative relation to the movable switch part and securely fixed to the box wall. A further advantage incident to this detachable mounting of the switch operating unit is that when it is desired to prevent the use of the current, the movable switch part may be disposed in its open position within the box and the operating means therefor then detached and removed, after which the box cover is closed and sealed.

The present invention is more particularly designed for use in connection with the knife type of electric switch and in one embodiment thereof a pivoted operating lever is provided with which the movable switch part is operatively engaged, said lever extending exteriorly of the box or casing, and means carried by the lever and rendered effective in the initial operating movement of the lever when the switch is closed to produce a quick break between the switch blades and the contacts and thereby prevent arcing of the current. As another item of improvement in switch boxes of this character we have devised improved means for sealing the cover in closed position which materially reduces the manufacturing cost of such boxes and enables the boxes to be compactly piled in superposed relation.

It is also a further general object of our invention to provide a switch as above characterized, the several parts of which are of simple and durable construction, positive and reliable in operation and capable of manufacture at a comparatively small cost.

With the above and other objects in view, the invention consists in the improved form, construction and relative arrangement of the several parts, as will be hereinafter more fully described, illustrated in the accompanying drawings and subsequently incorporated in the subjoined claims.

In the drawings wherein I have illustrated one satisfactory and practical embodiment of the invention and in which similar reference characters designate corresponding parts throughout the several views, Figure 1 is a vertical sectional view through a switch box illustrating a switch constructed in accordance with one form of the invention and showing the movable switch part in open position;

Figure 2 is a top plan view, the cover of the box being open.

Figure 3 is a sectional view taken on the line 3—3 of Figure 1;

Figure 4 is a view similar to Figure 1, the switch being closed;

Figure 5 is a detail view showing the manner in which the cam spring is flexed in the initial movement of the switch lever to effect a quick break of the movable switch blades from the contacts, and Figure 6 is a perspective view of the switch operating lever detached from the box wall.

Referring in detail to the drawings, the metal switch box or casing 5 is provided with a hinged cover 6. The walls of the box are provided with the usual cutout discs insecurely connected to the wall so that they can be readily removed and the line or current supply wires leading from the source of current supply extended into the interior of the box.

Within the box 5, a switch base 7 of porcelain or other suitable insulating material is securely fixed to the bottom wall of the box. This base has secured thereon the spaced live terminals 8 to which the current supply wires are connected. In spaced relation to the live terminals 8, the switch contacts 9 are mounted on the base 7 and are electrically connected through the medium of suitable fuse plugs arranged in receptacles on the base 7 with the conductors which lead to the meter and house connections.

We have herein shown the invention as applied to a two-wire system, but manifestly it may be adapted to use with any number of wires by simply varying the number of terminals, contacts and fuses and the number of movable switch blades. The switch blades 10 are pivotally connected at one of their ends, as at 11, to the live terminals 8 and at their other ends are connected to each other by the member 12 of suitable insulating material. The central portion of this member is provided with a slot 13 for a purpose to be presently disclosed.

One end wall of the box 5 is provided with a vertically disposed slot 14 opening upon the upper edge of said wall. The operating means for the movable switch blades comprises a lever 15 which is fulcrumed intermediate of its ends as at 16 upon one flange 17 of an angular supporting plate. The other flange 18 of this plate is provided with spaced vertically aligned slots 19 and between said slots with the opening 20. At the juncture of the angularly related flanges of the support, a slot 21 is formed in the flange 18.

The end wall of the box 5 is provided with inwardly and upwardly projecting lugs 22 which are spaced from the inner face of said wall and are adapted to be engaged through the slots 19 of the flange 18. The operating lever 15 extends through the slot 21 and has its end upwardly curved and equipped with a suitable handle 23.

In attaching the switch operating means the lever 15 is moved downwardly into the slot 14 in the end wall of the box the flange 18 of the lever supporting plate being engaged against the inner face of the box wall with the lugs 22 extending through the slots 19. When this plate is forced downwardly to the limit of its movement, the lugs 22 engage over the upper edges of the slots 19. The opening 20 in the flange 18 will then be in registering relation with an opening in the end wall of the box and through these registering openings, the bolt 24 whereby the grounding plate or lug 25 is attached to the box wall, is inserted. By then threading the nut 26 on the inner end of said bolt, the supporting plate for the switch operating lever is rigidly secured in its applied position upon the wall of the box.

To the lever 15 at a point adjacent its pivot 16, one end of a heavy wire spring 27 is suitably attached. This spring is disposed in the vertical plane of the lever and extends longitudinally thereof normally in divergent relation to the lever. Adjacent to its free end this wire spring is slightly curved or bent inwardly towards the lever as shown at 28 which results in a cam action in the opening movement of the switch as will be readily understood upon a comparison of Figures 1, 4 and 5 of the drawing.

Assuming that the switch operating lever 15 is in the position shown in Figure 4 and the switch blades 10 are in closed position in engagement with the contacts 9, when it is desired to open the switch, the handle 23 is forced downwardly. Initially, the other end of the lever 15 moves upwardly in the slot 13 of the connection member 12 without imparting a corresponding movement to the switch blades. During such initial movement of the lever 15, the free end of the spring 28 is brought into contact with the member 12 at the upper end of the slot 13 and as the movement of the lever in the slot continues this spring is placed under tension until the end of the lever contacts therewith as shown in Figure 5. Upon a further operating movement of the lever, the switch blades 10 are forced upwardly with respect to the spring contacts 9, and at the instant the switch blades are lifted from the contacts, the wire spring 28 by its independent action against the member 12, quickly snaps the switch blades upwardly until the member 12 at the lower end of the slot strikes against the lower edge of the lever. In this manner, there is an instantaneous breaking of the electric circuit and the switch blades are so far removed from the contacts 9 that arcing cannot possibly occur between the blades and said contacts. Owing to the curvature of the wire spring 27 as above explained, said spring has a camming action against the upper edge of the slot 13 and in the continued movement of the lever further urges the switch blades to open position, the lever moving freely through the slot 13 in the switch blade connecting member 12.

From the foregoing description, the construction and manner of operation of our improved switch will be fully understood. In installing the switch, the operating lever and its support is omitted and only the box is handled by the workmen. After the box has been properly positioned and secured, the several parts of the switch can be readily assembled and fixed in place and the necessary electrical connections made. Finally, the operating unit for the movable switch part is applied and secured to the box wall in the manner above explained. In view of the fact that no bolts or other similar connecting elements are necessary in operatively associating the lever with the movable switch part, the proper mounting and adjustment of the operating unit can be easily and quickly made without liability of the hands of the workmen coming into contact with the live terminals of the switch. It will be noted that the insulating bridge member 12 between the switch blades is of such dimensions as to provide an effectual guard against accidental contact of any part of the hand with the live switch blades when the switch is in open position.

The invention also has another important advantage in that when it is desired to prevent fraudulent use of the current without detection, the switch operating unit may be bodily removed from its applied position by merely first removing the bolt 24 and then lifting the lever support so as to disengage the flange 18 from the lugs 22 on the box wall, it being understood that the switch is in open position. The cover 6 is then closed and securely sealed so that access may not be had to the interior of the switch box. Heretofore, in the construction of switch boxes it has been customary to weld or otherwise permanently secure a lug to the inner side of one end wall of the box which projects beyond the edge of said wall and is adapted to engage with a slot in the said cover when the latter is closed, the said lug being provided with an aperture to receive a sealing wire. The provision of such a lug not only increases the manufacturing cost of the box but also renders it impossible to compactly pile the boxes in superposed relation. To overcome these disadvantages, we have herein shown the body wall of the cover depressed adjacent to one of its marginal flanges, as at 29 and separated from said marginal flange. This portion of the cover flange is provided with an opening 30 to coincide with a similar opening 31 in the side wall of the box when the cover is closed. Through these openings the sealing wire indicated at 32 is engaged and the ends of the wire connected by a lead seal or other equivalent means. It is manifest that this means for sealing the box, involving very simple mechanical operations and no additional parts will not materially add to the cost of manufacture. Also, as there are no projecting lugs as above referred to, a large number of the boxes may be compactly piled in superposed relation in storing or shipping the same.

From the above it will be understood that the essential and distinguishing feature of our present improvement resides in the provision of an externally operated actuating lever for the movable switch part which is pivotally mounted within the box or casing. In so far as we are aware, such switches mounted within closed and sealed boxes have not heretofore been actuated and moved to open and closed positions by means of an externally operated and pivotally mounted lever. We have found that such construction provides an efficient and serviceable operating means for the switch without necessitating the opening of the box and one which may be manufactured and sold at relatively small cost.

In the accompanying drawings, we have shown what we have found to be a very satisfactory and practical embodiment of the invention, but it is manifest that this disclosure is susceptible of many modifications and that the invention might be embodied in various other alternative structures. Accordingly, we reserve the privilege of adopting all such legitimate changes in the form, construction and arrangement of the several parts as may be fairly embodied within the spirit and scope of the invention as claimed.

We claim:

1. In combination with a switch box and a switch enclosed therein including a movable part, an operating unit for the movable switch part including a member projecting exteriorly of the box, and means for detachably mounting said unit upon one of the box walls in operative connection with the movable switch part, said means having an interlocking engagement with one of the walls of said box permitting of the bodily removal of said operating unit from its applied position upon the box.

2. In combination with a switch box and a switch enclosed therein having a movable part, an operating unit for the movable switch part including a support and a member mounted upon the support to coact with the movable switch part and to extend exteriorly of the box, and means for detachably mounting said support upon one of the box walls whereby said unit may be bodily removed from its operative position to render the switch inoperative.

3. In combination with a switch box and a switch enclosed therein having a movable part, an operating unit for the movable switch part including a support, a lever pivotally mounted upon said support to extend exteriorly of the box and having a separable operating connection with the movable switch part, and means for detachably mounting the support upon one wall of the box whereby said support and the lever may be bodily removed as a unit to thereby render the switch inoperative when the box is closed.

4. In combination with a switch box and a switch enclosed therein having a movable part, said box provided with a slot in one wall, an operating unit for the switch part including a support and a lever pivotally mounted thereon adapted for engagement in said slot, means for detachably securing the support upon the inner face of said box wall, and means constituting a separable operating connection between the movable switch part and said lever, whereby upon the removal of the support from its applied position on the box wall, said lever is disconnected from the movable switch part and the switch rendered inoperative.

5. In a knife switch, pivoted switch blades, an insulating member connecting said blades to each other at one of their ends and having a slot therein, a pivoted lever operating in said slot to move the blades to open and closed position, and means carried bodily by the lever coacting with said member and put in tension in the initial movement of the lever when the blades are in closed position to effect a quick breaking movement of the switch blades.

6. In a knife switch, spaced pivoted switch blades, an insulating member connecting said switch blades to each other and having a slot therein, a pivoted lever operating in said slot to move the blades to open and closed position, and means carried bodily by said lever and extending through said slot put in tension in the initial movement of the lever when the switch blades are in closed position to cause a quick breaking movement of the switch blades.

7. In a knife switch, spaced pivoted switch blades, an insulating member connecting said blades to each other and having a slot therein, a pivoted lever operating in said slot to move the blades to open and closed position, a resilient wire carried by said lever and extending longitudinally thereof through said slot, said wire being tensioned in the initial movement of the lever when the blades are in closed position and coacting with the insulating member to cause a quick breaking movement of the switch blades in the opening movement of the switch lever.

8. In a knife switch, spaced pivoted switch blades, an insulating member connecting said blades to each other and having a slot therein, a pivoted lever operating in said slot to move the blades to open and closed position, a resilient wire carried by said lever and extending longitudinally thereof through said slot, said wire being tensioned in the initial movement of the lever when the blades are in closed position and coacting with the insulating member to cause a quick breaking movement of the switch blades in the opening movement of the switch lever, said wire having a curved cam portion acting upon the insulating member to move the switch blades independently of the lever to the extent afforded by the length of said slot.

9. In combination with a switch box and a switch enclosed therein including a movable part, said box having a slot in one wall, and a lever pivotally mounted within said box operatively connected to the movable switch part and carrying bodily tensioning means, said lever extending externally of the box through said slot and having an operating handle on its outer end.

In testimony that we claim the foregoing as our invention, we have signed our names hereunder.

DAVID POSTAL.
SAM. HAMMER.